(12) United States Patent
Sandstrom et al.

(10) Patent No.: US 8,843,789 B2
(45) Date of Patent: *Sep. 23, 2014

(54) STORAGE ARRAY NETWORK PATH IMPACT ANALYSIS SERVER FOR PATH SELECTION IN A HOST-BASED I/O MULTI-PATH SYSTEM

(75) Inventors: Harold M. Sandstrom, Belmont, MA (US); Amanuel Ronen Artzi, Framingham, MA (US); Michael E. Bappe, Loveland, CO (US); Helen S. Raizen, Jamaica Plain, MA (US); William Z. Zahavi, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 148 days.

This patent is subject to a terminal disclaimer.

(21) Appl. No.: 13/476,072

(22) Filed: May 21, 2012

(65) Prior Publication Data

US 2012/0233494 A1    Sep. 13, 2012

Related U.S. Application Data

(63) Continuation of application No. 11/819,612, filed on Jun. 28, 2007, now Pat. No. 8,204,980.

(51) Int. Cl.
*G06F 11/00* (2006.01)
*G06F 11/07* (2006.01)
*G06F 11/20* (2006.01)

(52) U.S. Cl.
CPC ............ *G06F 11/079* (2013.01); *G06F 11/201* (2013.01); *G06F 11/0727* (2013.01); *G06F 11/0766* (2013.01)
USPC .......................................................... 714/43

(58) Field of Classification Search
None
See application file for complete search history.

(56) References Cited

U.S. PATENT DOCUMENTS

| | | | | |
|---|---|---|---|---|
| 5,568,491 A | * | 10/1996 | Beal et al. | 714/746 |
| 5,941,992 A | * | 8/1999 | Croslin et al. | 714/4.2 |
| 6,636,981 B1 | * | 10/2003 | Barnett et al. | 714/4.5 |
| 6,704,812 B2 | * | 3/2004 | Bakke et al. | 710/38 |
| 6,725,295 B2 | * | 4/2004 | Iwatani | 710/38 |
| 6,725,401 B1 | * | 4/2004 | Lindhorst-Ko | 714/47.3 |

(Continued)

OTHER PUBLICATIONS http://enterprise.symantec.com, Data Sheet: Storage Management, Veritas CommandCentral™ Storage by Symatec, Centralized Visibility and Control Across Heterogeneous Storage Environments, pp. 1-4.

(Continued)

*Primary Examiner* — Amine Riad
(74) *Attorney, Agent, or Firm* — Daly, Crowley, Mofford & Durkee, LLP

(57) ABSTRACT

Systems and methods are provided for selecting a path for an I/O in a storage area network. In one embodiment, a method comprises receiving path configuration information for paths associated with a host device connected to the storage area network, a listing of components within the storage area network, and a notification of a component failure within the storage area network. The method may also comprise correlating the received path configuration information, the received listing of components, and the received notification of component failure to determine one determine one or more paths associated with the host device affected by the component failure. The method may further comprise transmitting to the host device an alert for the one or more affected paths.

20 Claims, 5 Drawing Sheets

(56) References Cited

U.S. PATENT DOCUMENTS

| | | | |
|---|---|---|---|
| 6,754,853 B1* | 6/2004 | DeKoning et al. | 714/42 |
| 6,804,712 B1* | 10/2004 | Kracht | 709/223 |
| 7,111,084 B2* | 9/2006 | Tan et al. | 710/15 |
| 7,257,744 B2* | 8/2007 | Sabet et al. | 714/56 |
| 7,260,628 B2* | 8/2007 | Yamamoto et al. | 709/224 |
| 7,307,948 B2* | 12/2007 | Infante et al. | 370/225 |
| 7,318,138 B1* | 1/2008 | Usgaonkar et al. | 711/163 |
| 7,340,649 B2* | 3/2008 | Angamuthu et al. | 714/27 |
| 7,349,961 B2* | 3/2008 | Yamamoto | 709/224 |
| 7,370,241 B2* | 5/2008 | Nicholson et al. | 714/47.2 |
| 7,376,764 B1* | 5/2008 | Todd | 710/38 |
| 7,406,039 B2* | 7/2008 | Cherian et al. | 370/228 |
| 7,409,586 B1* | 8/2008 | Bezbaruah et al. | 714/13 |
| 7,454,533 B2* | 11/2008 | Miki | 710/38 |
| 7,475,328 B2 | 1/2009 | Kubota et al. | |
| 7,565,570 B2* | 7/2009 | Dohi | 714/6.11 |
| 7,617,320 B2* | 11/2009 | Alon et al. | 709/229 |
| 7,634,691 B2* | 12/2009 | Komatsu et al. | 714/43 |
| 7,707,151 B1* | 4/2010 | Blumenau et al. | 711/165 |
| 7,756,830 B1* | 7/2010 | Chao et al. | 707/638 |
| 7,783,779 B1* | 8/2010 | Scales et al. | 709/240 |
| 2002/0080445 A1* | 6/2002 | Falkenstein et al. | 359/127 |
| 2002/0156888 A1 | 10/2002 | Lee et al. | |
| 2002/0156918 A1* | 10/2002 | Valdevit et al. | 709/238 |
| 2003/0051195 A1* | 3/2003 | Bosa et al. | 714/43 |
| 2003/0204786 A1* | 10/2003 | Dinker et al. | 714/43 |
| 2003/0210416 A1* | 11/2003 | Lewis et al. | 358/1.13 |
| 2003/0236074 A1* | 12/2003 | Ishii et al. | 455/69 |
| 2004/0078632 A1 | 4/2004 | Infante et al. | |
| 2004/0117369 A1 | 6/2004 | Mandal et al. | |
| 2004/0205238 A1* | 10/2004 | Doshi et al. | 709/241 |
| 2004/0210656 A1 | 10/2004 | Beck et al. | |
| 2004/0260736 A1 | 12/2004 | Kern et al. | |
| 2005/0015685 A1* | 1/2005 | Yamamoto | 714/54 |
| 2005/0028028 A1 | 2/2005 | Jibbe | |
| 2005/0108450 A1 | 5/2005 | Sahara et al. | |
| 2005/0144511 A1 | 6/2005 | Chih | |
| 2005/0188126 A1 | 8/2005 | Mashima et al. | |
| 2005/0262562 A1 | 11/2005 | Gassoway | |
| 2006/0026346 A1* | 2/2006 | Kadoiri et al. | 711/114 |
| 2006/0034181 A1 | 2/2006 | Noguchi et al. | |
| 2006/0047712 A1 | 3/2006 | Shitomi et al. | |
| 2006/0143332 A1 | 6/2006 | Yagi et al. | |
| 2006/0165002 A1 | 7/2006 | Hicks et al. | |
| 2006/0209707 A1 | 9/2006 | Nakaya et al. | |
| 2006/0253526 A1 | 11/2006 | Welch et al. | |
| 2007/0055797 A1 | 3/2007 | Shimozono | |
| 2007/0093124 A1 | 4/2007 | Varney et al. | |
| 2007/0112974 A1 | 5/2007 | Shirogane et al. | |
| 2007/0153683 A1 | 7/2007 | McAlpine | |
| 2007/0169186 A1 | 7/2007 | Ueoka et al. | |
| 2007/0234113 A1 | 10/2007 | Komatsu et al. | |
| 2008/0228987 A1 | 9/2008 | Yagi et al. | |
| 2009/0125754 A1 | 5/2009 | Chandra et al. | |
| 2009/0210620 A1 | 8/2009 | Jibbe et al. | |
| 2009/0257361 A1 | 10/2009 | Deshpande et al. | |

OTHER PUBLICATIONS

Sanscreen®, The Enabler for Storage service Management, Jan. 2006.

RSA Technology Solution Brief: Powerpath® Encryption with RSA: The EMC Solution for Securing Data in Enterprise Storage, 16 pages.

Office Action dated Jun. 29, 2010 for U.S. Appl. No. 11/819,611, 17 pages.

Response to Office Action dated Mar. 25, 2010 for U.S. Appl. No. 11/819,611 (response filed Apr. 16, 2010), 14 pages.

Office Action dated Mar. 9, 2009 U.S. Appl. No. 11/475,060, filed Jun. 27, 2006, 16 pages.

Response to Office Action dated Mar. 9, 2009 (submitted Jun. 4, 2009) for U.S. Appl. No. 11/475,060, filed Jun. 27, 2006, 14 pages.

Final Office Action dated Feb. 3, 2010 U.S. Appl. No. 11/475,060, 12 pages.

Response to Final Office Action dated Feb. 3, 2010 for U.S. Appl. No. 11/475,060 8 pages.

U.S. Appl. No. 11/819,611, filed Jun. 28, 2007, file through Jul. 11, 2012, 284 pages.

U.S. Appl. No. 11/475,060, filed Jun. 27, 2006, file through Jul. 11, 2012, 271 pages.

U.S. Appl. No. 11/819,612, filed Jun. 28, 2007, file through Jul. 11, 2012, 351 pages.

U.S. Appl. No. 11/819,609, filed Jun. 28, 2007, file through Jul. 11, 2012, 1021 pages (3 parts).

* cited by examiner

STORAGE ARRAY NETWORK PATH IMPACT ANALYSIS SERVER FOR PATH SELECTION IN A HOST-BASED I/O MULTI-PATH SYSTEM

RELATED PATENT APPLICATIONS

This patent application is a continuation of and claims priority to application Ser. No. 11/819,612, filed Jun. 28, 2007 and entitled "STORAGE ARRAY NETWORK PATH IMPACT ANALYSIS SERVER FOR PATH SELECTION IN A HOST-BASED I/O MULTI-PATH SYSTEM," which is incorporated herein by reference in its entirety.

DESCRIPTION

I. Technical Field

The present invention generally relates to the field of enterprise path management. More particularly, the invention relates to systems and methods for path impact analysis in a storage area network.

II. Background Information

Enterprise storage systems store data in large-scale environments and differ from consumer storage systems in both the size of the environment and the types of technologies that store and manage the data. A large-scale environment that stores data is typically referred to as a storage area network (SAN). SANs are commonly used in enterprise storage systems to transfer data between computer systems and storage devices. A typical SAN provides a communication infrastructure, including physical connections between computer systems, storage devices, and a management layer, which organizes the connections, storage devices, and computer systems.

In a SAN environment, computer systems, typically referred to as hosts, connect to the SAN via one or more host bus adapters. The SAN itself may include thousands of different inter-related logical and physical entities. In the case of a Fibre Channel SAN, these entities, which comprise the connections between hosts and storage devices may include Fibre Channel host bus adapters, Fibre Channel switches, Fibre Channel routers, and the like. The entities may be physically connected through the use of twisted-pair copper wire, optical fiber, or any other means of signal transmission.

Storage devices may include multiple disk drives that combine to form a disk array. A typical disk array includes a disk array controller, a cache, disk enclosures, and a power supply. Examples of disk arrays include the SYMMETRIX Integrated Cache Disk Array System and the CLARIION Disk Array System, both available from EMC Corporation of Hopkinton, Mass. A disk array controller is a piece of hardware that provides storage services to computer systems that access the disk array. The disk array controller may attach to a number of disk drives that are located in the disk enclosures. For example, the disk drives may be organized into RAID groups for efficient performance. RAID (redundant array of inexpensive disks) is a system that uses multiple disk drives that share or replicate data among the drives. Accordingly, in a RAID system, instead of identifying several different hard drives, an operating system will identify all of the disk drives as if they are a single disk drive.

Disk array controllers connect to a SAN via a port. A port serves as an interface between the disk array controller and other devices, such as the hosts, in the SAN. Each disk array controller typically includes two or more ports. Disk array controllers may communicate with other devices using various protocols, such as the SCSI (Small Computer System Interface) command protocol over a Fibre Channel link to the SAN. In the SCSI command protocol, each device is assigned a unique numerical identifier, which is referred to as a logical unit number (LUN). Further, communication using the SCSI protocol is said to occur between an "initiator" (e.g., a host) and a "target" (e.g., a storage device) via a path. For example, a path may include a host bus adapter, an associated SCSI bus or Fibre Channel cabling, and a single port of a disk array controller.

Management of a path is provided by a path management software. An example of the path management software is EMC POWERPATH system developed by EMC Corporation of Hopkinton, Mass. Path management software is a host-based software solution that is used to manage SANs and, among other things, can detect load imbalances for disk array controllers in a SAN and can select alternate paths through which to route data. In present systems, the path management software selects alternate paths after realizing that a first path has failed. Path failure may occur, for example, from the complete or partial failure of components within the SAN. However, in a SAN that may comprise thousands of entities, the path management software is unable to detect the root cause of the path failure. Thus, in selecting an alternate path, the path management software simply avoids all paths having a common end point as the failed path. However, there may be many paths with uncommon end points from the failed path which include the failed entity. Therefore, this method of alternate path selection is inefficient.

In view of the foregoing, what is needed is a system and method that is capable of utilizing the path configuration information of a path management software, the topology of a SAN, and an identified root cause failure of a path in the selection algorithm/method of an alternate path. The obtaining and coordination of path configuration information, topology information, and detected root cause path failure and its impact on data path may be centralized in one entity, such as a path impact analysis server.

SUMMARY

Consistent with an embodiment of the present invention, a method is provided for selecting a path for an I/O in a storage area network. The method may comprise receiving path configuration information for paths associated with a host device connected to the storage area network, a listing of components within the storage area network, and a notification of a component failure within the storage area network. The method may also comprise correlating the received path configuration information, the received listing of components, and the received notification of component failure to determine one or more paths associated with the host device affected by the component failure. The method may further comprise transmitting to the host device an alert for the one or more affected paths.

Consistent with another embodiment of the present invention, a system is provided for selecting a path for an I/O in a storage area network. The system may comprise a host device connected to the storage area network. The system may also comprise a path impact analysis server for receiving path configuration information associated with the host device, a listing of components within the storage area network, and a notification of a component failure within the storage area network, wherein the path impact analysis server correlates the received path configuration information, the received listing of components, and the received notification of component failure to determine one or more paths associated with the host device affected by the component failure and transmits to the host device an alert for the one or more affected paths.

Consistent with yet another embodiment of the present invention, a computer-readable medium is provided which includes program instructions for performing, when executed by a processor, a method for selecting a path for an I/O in a storage area network. The method may comprise receiving path configuration information associated with a host device connected to the storage area network, a listing of components within the storage area network, and a notification of a component failure within the storage area network. The method may also comprise correlating the received path configuration information, the received listing of components, and the received notification of component failure to determine one or more paths associated with the host device affected by the component failure. The method may further comprise transmitting to the host device an alert for the one or more affected paths.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Figure 1:
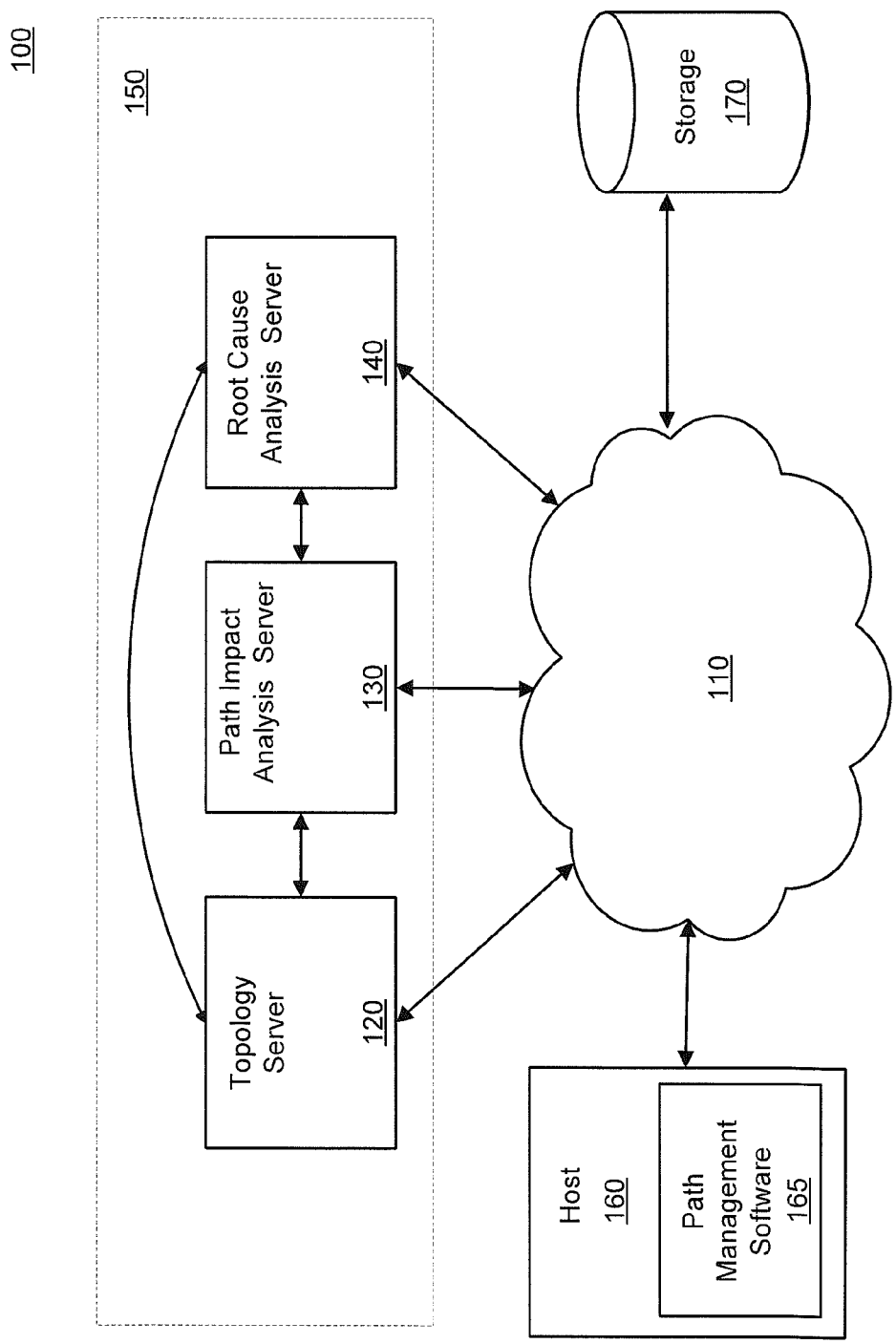
FIG. 1 illustrates an exemplary system, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

The methods and apparatus of the present invention are intended for use in storage area networks (SANs) that include data storage systems, such as the SYMMETRIX Integrated Cache Disk Array System or the CLARIION Disk Array System available from EMC Corporation of Hopkinton, Mass. and those provided by vendors other than EMC Corporation.

The methods and apparatus of the present invention may take the form, at least partially, of program code (i.e., instructions) embodied in tangible media, such as floppy diskettes, CD-ROMs, hard drives, random access or read only-memory, or any other machine-readable storage medium, including transmission medium. When the program code is loaded into and executed by a machine, such as a computer, the machine becomes an apparatus for practicing the invention. The methods and apparatus of the present invention may be embodied in the form of program code that is transmitted over some transmission medium, such as over electrical wiring or cabling, through fiber optics, or via any other form of transmission. When implemented on a general-purpose processor, the program code combines with the processor to provide a unique apparatus that operates analogously to specific logic circuits. The program code (software-based logic) for carrying out the method is embodied as part of the system described below.

FIG. 1 illustrates an exemplary system 100, consistent with certain aspects related to the present invention. As shown, system 100 may include a topology server 120, a path impact analysis server 130, and a root cause analysis server 140. Topology server 120, path impact analysis server 130, and root cause analysis server 140 may be collectively referred to as SAN management entities 120-140. Moreover, although the SAN management entities 120-140 are illustrated in FIG. 1 as separate devices, the functionalities of the SAN management entities 120-140 may be combined and contained in one server, such as in a management server 150. System 100 also comprises a SAN 110, a host 160, which comprises path management software 165, and a storage device 170.

As illustrated in FIG. 1, topology server 120, path impact analysis server 130, root cause analysis server 140, host 160, and storage device 170 are connected to SAN 110. One of skill in the art will appreciate that although one of each server 120-140, one host 160, and one storage device 170 are depicted in FIG. 1, any number of servers, hosts, and storage devices may be provided. Furthermore, one of ordinary skill in the art will recognize that functions provided by one or more components of system 100 may be combined.

Storage area network (SAN) 110 provides communications between the various entities in system 100, such as the SAN management entities 120-140, host 160, and storage device 170. SAN 110 may be a shared, public, or private network and encompasses a wide area or local area. SAN 110 may be implemented through any suitable combination of wired and/or wireless communication networks. Furthermore, SAN 110 may include a local area network (LAN), a wide area network (WAN), an intranet, or the Internet.

Figure 2:
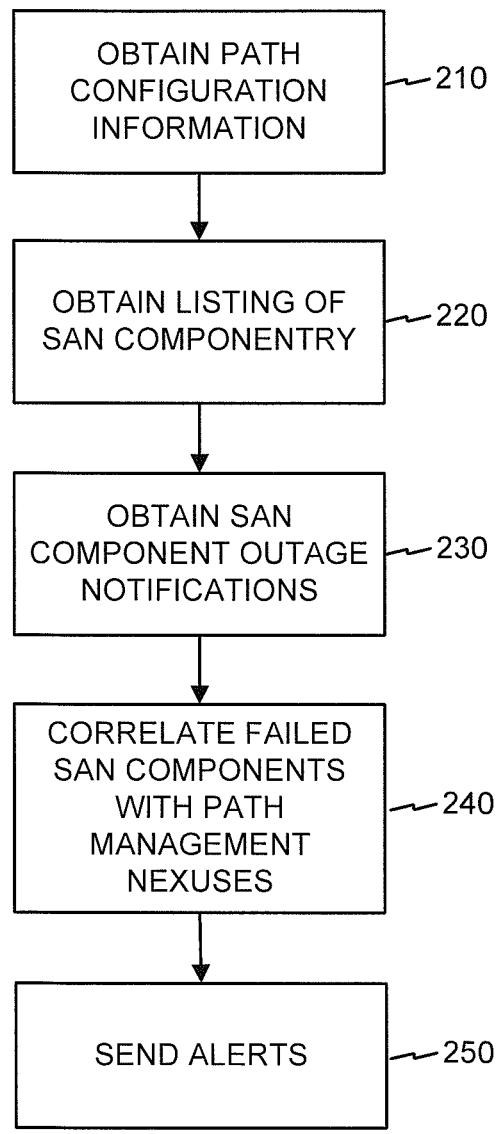
FIG. 2 is a flow diagram of an exemplary method for selecting a path in a storage area network, consistent with an embodiment of the present invention.

FIG. 2 illustrates a flow chart of an exemplary method, consistent with an embodiment of the present invention. The illustrated steps provide the functionality of the path impact analysis server 130 to aid the path management software 165 of a host 160 in path selection in the event of a path failure. In an initial step, the path impact analysis server 130 obtains path configuration information in the form of initiator-target-LUN nexuses from the path management server 155 located on each host 160 connected to the SAN 110 (step 210). The "initiator-target-LUN" form refers to an exemplary format of storing path configuration information. This format begins with the device initiating the communication (e.g., the host 160) followed by the target (e.g., storage device 170) and the LUN. The path configuration information may be obtained through a series of "get" operations.

Next, for each path nexus reported by path management server 155, the path impact analysis server 130 may obtain a listing of components with the SAN 110 from the topology server 120 (step 220). Moreover, the path impact analysis server 130 may obtain notifications regarding the outage of components within the SAN 110 from the root cause analysis server 140 (step 230). The root cause analysis server 140 may pinpoint component failures on the basis of SAN management alerts from the SAN components or their proxy agents.

Subsequent to obtaining the information from the path management server 155, the topology server 120, and the root cause analysis server 140, the path impact analysis server 130 correlates the failed component(s) of the SAN 110 with all known path nexuses and determines the impact of the failure/degradation of a component on one or more paths of interest (step 240). Finally, the path impact analysis server 130 may send alerts for each affected host 160 containing references to the affected paths. The steps of FIG. 2 are discussed in further detail below.

As used herein the term "path failure" refers to the inability of the path to transmit an I/O from an initiator to a target. The term "path failure" may also refer to any measurable degradation in transmission metrics of the path. For example, transmission metrics of the path may include mean queue length, mean response time, mean throughput, and the like. The degradation of transmission metric needed to constitute a path failure may be variable, and may be defined by an administrator of the SAN. Moreover, a failure of a component in a path may include the complete failure of the component or a partial failure of the component, such as the failure of a port of the component.

Figure 3:
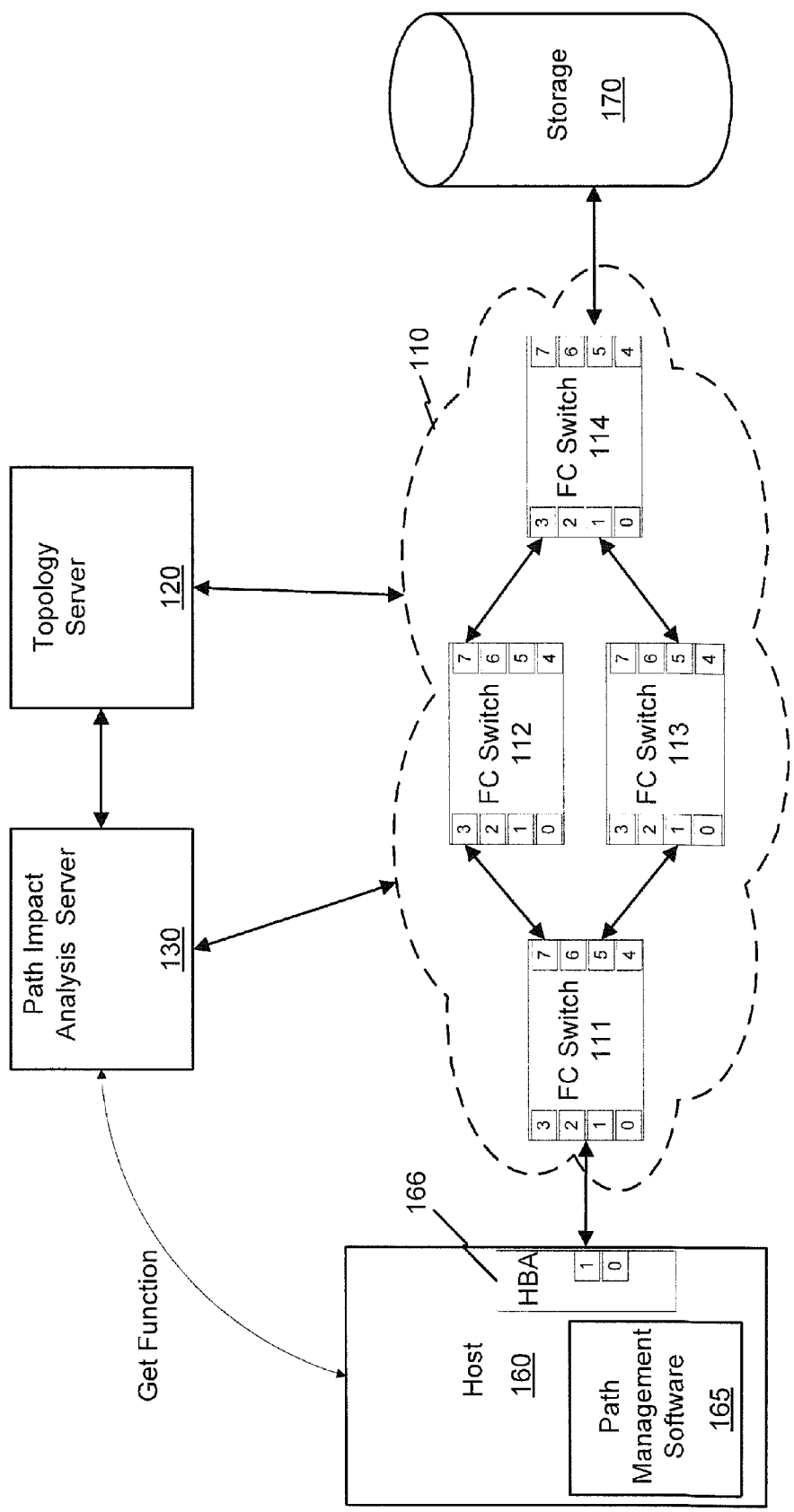
FIG. 3 illustrates an exemplary embodiment of the interaction and communication among a path impact analysis server, a path management software, and a topology server, consistent with an embodiment of the present invention.

FIG. 3 illustrates an exemplary embodiment of the interaction and communication among the path impact analysis server 130, the path management software 165, and the topology server 120 during the process of obtaining path configuration information and SAN components as illustrated in steps 210 and 220 of FIG. 2. The connection between the host 160 and the SAN 110 may be provided by a host bus adapter (HBA) 166. In particular, the HBA 166 provides a physical and logical connection between the bus of the host 160 and the bus of the SAN 110. In the exemplary embodiment illustrated in FIG. 3, the SAN 110 is comprised of FC switches 111, 112, 113, and 114. As understood by one of ordinary skill in the art, SAN 110 may comprise more or less switches.

The paths (i.e., the physical and logical paths between the host 160 and the storage device 170) are referenced in the path management software 165. Based upon the number of FC switches 111-114, the number of ports on each FC switch, the number of HBAs 166 on each host 160, and the number of ports on the storage device 170, there may be hundreds of paths. These multiple paths allow the path management software 165 to switch to an alternate path in the event of a path failure.

The multiple paths may be retrieved from the path management software 165 through the initiation of a "get" function by the path impact analysis server 130. The multiple paths may be logically grouped and transmitted to the path impact analysis server 130 in response to receiving the "get" function. For example, a logical group may include a path redundancy group, which represents the general attributes and properties of the associated multiple data paths.

In addition to receiving the multiple data paths of the path management software 165, the path impact analysis server 130 may also receive the topology of the SAN from the topology server 120. That is, for each data path reported by the path management software 165, the path impact analysis server obtains and correlates a listing of the SAN components that are used to create and enable the data path from the topology server 120. The topology server 120 may be capable of retrieving both the physical topology and logical topology of the SAN 110. The physical topology of the SAN 110 may include the location of the FC switches 111-114 and the layout of the signal transmission connections between the FC switches 111-144. The logical topology of the SAN 110 may include the mapping of the apparent connections that may be made as I/O communications travel along the multiple data paths of the SAN 110.

Topology server 120 may store the topology of the SAN 110 in a configuration table. The configuration table may include the components of the SAN 110, wherein the components may be identified by world-wide name (WWN), product identification, serial number, and/or any other identifier. The configuration table may further store status and state information about a host 160, such as whether the host 160 has established paths to a particular storage device 170. For example, the configuration table may indicate, for each host, all paths that the host has established and the storage device for each path.

Figure 4:
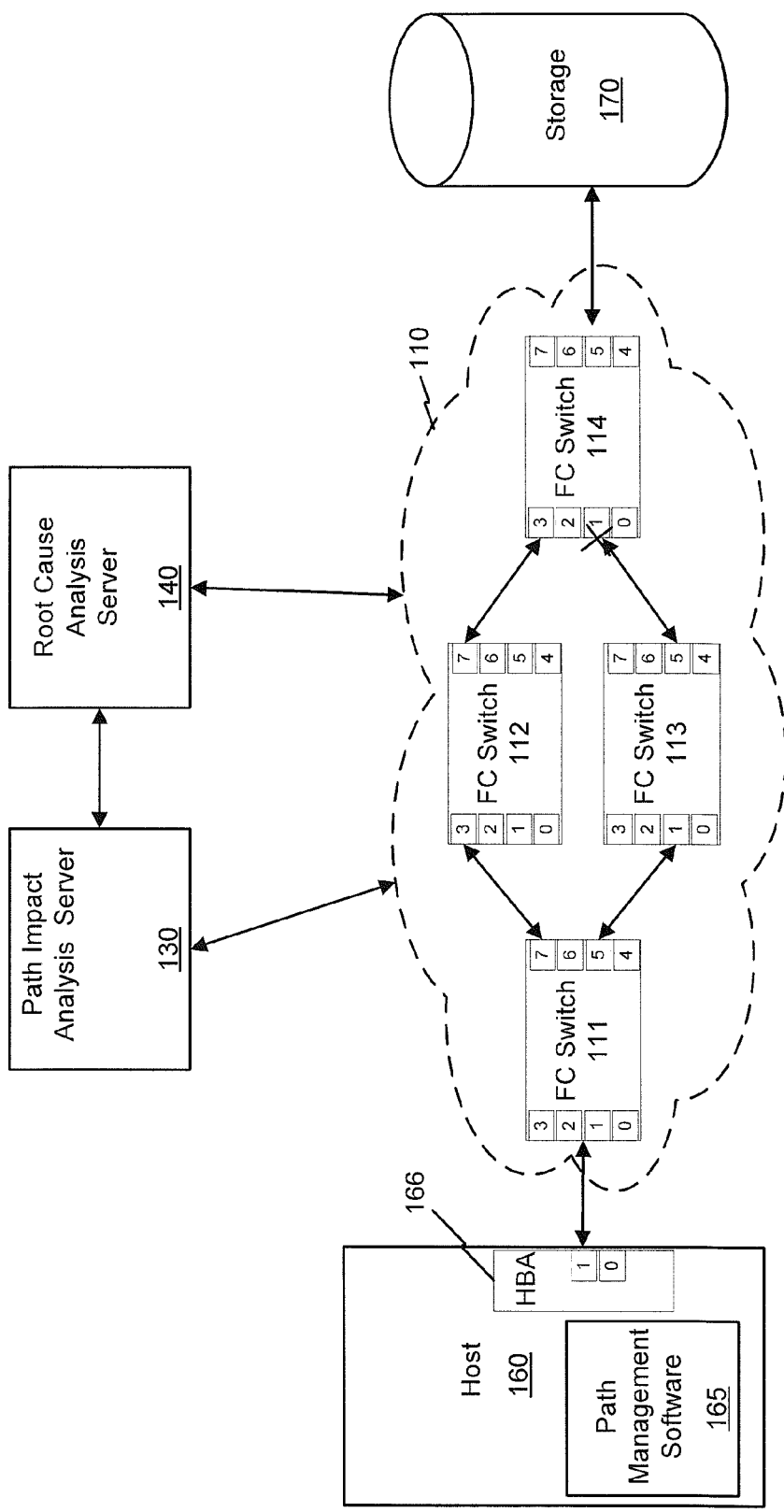
FIG. 4 illustrates an exemplary embodiment of the interaction and communication between a path impact analysis server and a root cause analysis server, consistent with an embodiment of the present invention.

FIG. 4 illustrates an exemplary embodiment of the interaction and communication between the path impact analysis server 130 and the root cause analysis server 140 during the process of obtaining SAN component outage notifications and correlating failed SAN components with the multiple data paths reported by the path management software 165, as illustrated in steps 230 and 240 of FIG. 2. Root cause analysis server 140 may determine the root cause of a path failure through the use of a correlation technique.

A determination of a root cause in the event of a port failure, for example, port 1 of FC switch 114, is illustrated in FIG. 4 through the use of the symbol "X". In the event of such a port failure, path management software 165 may detect the unusable path and direct I/O communications to other paths, for example, through port 3 of FC switch 112 and port 3 of FC switch 114. The path management software that is not aware of the SAN topology and specific state/status of the components within it, is unable to detect that the root cause of the path failure was a result of the failure of port 1 on FC switch 114. However, the root cause analysis server 140 is capable of detecting the root cause failure of the path by utilizing, for example, a correlation technique. Examples of correlation techniques are a correlation table or EMC Smarts Codebook Correlation Technology.

A correlation table stored in the root cause analysis server 140 may compare path failure notifications received from the path impact analysis server 130 to measure elements of cause stored in the correlation table in order to determine the most likely root cause of the one or more of the observed symptoms or events. Other symptoms or events of a path may also be also be reported to the root cause analysis server 140 by the path management software 165 and/or other related SAN components. The correlation table may include, for example, specific measured elements to determine a specific event, such as a switch port failure.

In another embodiment, EMC Smarts Codebook Correlation Technology may be utilized by the root cause analysis server 140 as a correlation technique. In this embodiment, a codebook is provided that includes a mapping between each of a plurality of groups of possible path symptoms and one of a plurality of likely exceptional events (e.g., problems) in the system. When a path failure notification is received from the path impact analysis server 130, a mismatch measurement is determined between each of the plurality of groups of possible path failures in the mapping and the one or more known path failures, while disregarding path failures in the groups of possible path failures not determined to be known. One or more of the plurality of likely problems is selected corresponding to one of the plurality of groups having the smallest mismatch measure. As indicated above, other symptoms or events of a path may also be also be reported to the root cause analysis server 140 by the path management software 165 and/or other related SAN components.

Figure 5:
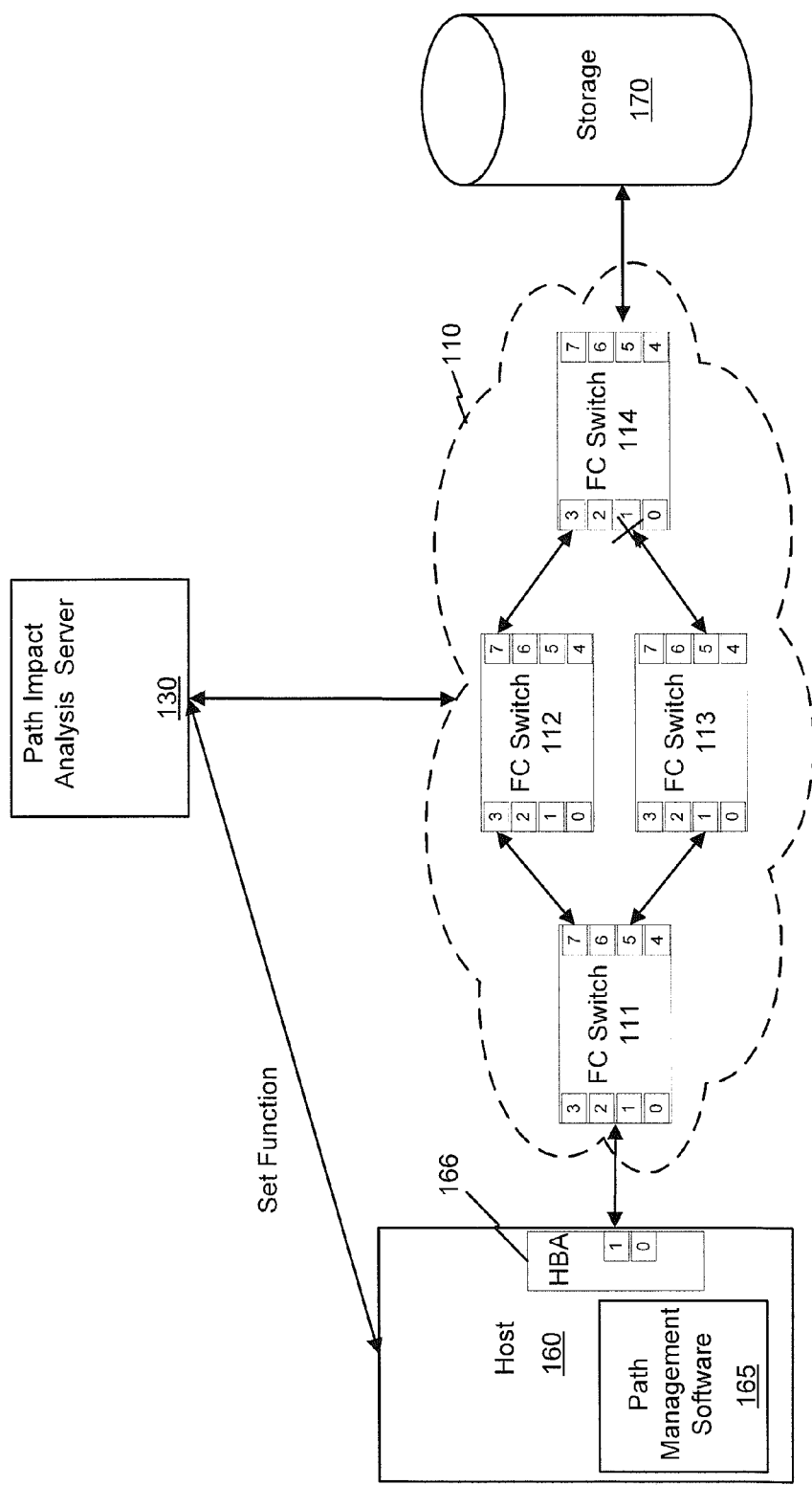
FIG. 5 illustrates an exemplary embodiment of the interaction and communication between a path impact analysis server and a host, consistent with an embodiment of the present invention.

FIG. 5 illustrates an exemplary embodiment of the interaction and communication between the path impact analysis server 130 and the host 160 during the process of sending alerts for paths of the path management software 165, as illustrated in step 250 of FIG. 2. In particular, the path impact analysis server 130 may correlate the failed SAN component with all know path nexuses of the path management software 165 and send an alert for affected hosts containing references to the affected paths. The alert transmitted to the path management software 165 executed on the identified host 160 may identify a path corresponding to the device that has experienced a failure or that has been taken offline. To identify a path, a host path world-wide name, an array port world-wide name, and a LUN storage world-wide name may be identified by the path impact analysis server 130. Furthermore, when identifying a path, path impact analysis server 130 may transmit a "state" of the identified path. States may include an "alive" state, a "dead" state, a "degraded" state, and a "warning" state. The "alive" state may indicate that a path is currently operating; the "dead" state may indicate a path is not operating; and the "degraded" state may indicate that a path is not operating as expected. The "warning" state may be used in situations where a path is experiencing symptoms of operating difficulties, but the path impact analysis server 130 may be missing detailed enough topological and/or root cause analysis information and cannot determine whether the path is degraded or dead.

The path management software 165 may use the notification sent by the path impact analysis server 130 to select a specific alternate path to avoid the failed component. Moreover, when a component failure/degradation has been fixed, the root cause analysis server 140 may notify the path impact analysis server 130. Subsequently, the path impact analysis server 130 may release the alert for paths that were previously affected by that component. The path management software 165 may then add the paths as candidates for future selection. As a result of receiving alerts and the release of alerts from the path impact analysis server 130, the path management software 165 has the knowledge of when to test a path for availability and hence, the efficiency of the path management software 165 is improved.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method comprising:
   providing a path management module coupled to a storage area network, the storage area network comprising a plurality of paths from a storage device to a host device and comprising a plurality of components on the plurality of paths;
   receiving path configuration information for the plurality of paths, a listing of the plurality of components within the storage area network, and a notification of a failure of a first component of the plurality of components within the storage area network;
   correlating the received path configuration information, the received listing of the components, and the received notification of the failure of the first component to determine one or more paths associated with the host device affected by the failure; and
   selecting, using the path management module, an alternative one of the paths to avoid the failed first component.

2. The method of claim 1 wherein selecting, using the path management module, an alternative one of the paths to avoid the failed first component comprises selecting an alternative one of the paths to avoid a failed port on a.

3. The method of claim 1, further comprising, transmitting the received path configuration information using the path management module residing on the host device.

4. The method of claim 3, further comprising:
   transmitting the received listing of components using a topology server coupled to the storage area network; and
   transmitting the received notification of the failure using a root cause analysis server coupled to the storage area network.

5. The method of claim 4, combining functionalities of the topology server and the root cause analysis server into a single server.

6. The method of claim 1, further comprising using the received path configuration information in the form of initiator-target-LUN nexuses.

7. The method of claim 1, further comprising wherein the received path configuration information is logically grouped.

8. A system comprising:
   a host device coupled to the storage area network, the storage area network comprising a plurality of paths from a storage device to a host device and comprising a plurality of components on the plurality of paths;
   a path impact analysis server for receiving path configuration information associated with the host device, a listing of the plurality of components within the storage area network, and a notification of a failure of a first component of the plurality of components within the storage area network, wherein the path impact analysis server is configured to:
      correlate the received path configuration information, the received listing of components, and the received notification of the failure of the first component to determine one or more paths associated with the host device affected by the failure; and
   a path management module in the host to select an alternative one of the paths to avoid the first component.

9. The system of claim 8, wherein the plurality of components comprises a plurality of ports.

10. The system of claim 8, wherein the received path configuration information of the host device is transmitted by the path management module residing on the host device.

11. The system of claim 9, further comprising:
   a topology server coupled to the storage area network and configured to transmit the received listing of the plurality of components; and
   a root cause analysis server coupled to the storage area network and configured to transmit the notification of the failure.

12. The system of claim 11, wherein the functionalities of the path impact analysis server, the topology server, and the root cause analysis server are combined into one server.

13. The system of claim 8, wherein the received path configuration information is in the form of initiator-target-LUN nexuses.

14. The system of claim 8, wherein the received path configuration information is logically grouped.

15. An article comprising:
   a non-transitory machine-readable medium that stores executable instructions to select a path for an I/O in a storage area network, the storage area network comprising a plurality of paths from a storage device to a host device and comprising a plurality of components on the plurality of paths, the instructions when executed by a machine causing a machine to:
      receive path configuration information associated with the host device, a listing of the plurality of components within the storage area network, and a notification of a component failure of the first component of the plurality of components within the storage area network;
      correlate the received path configuration information, the received listing of the plurality of components, and the received notification of the failure of the first component to determine one or more paths associated with the host device affected by the failure; and
      select an alternative one of the paths to avoid the failed first component.

16. The article of claim 15, wherein the plurality of components comprises a plurality of ports.

17. The article of claim 15, wherein the received path configuration information of a host device is transmitted by a path management software residing on the host device.

18. The article of claim 16, wherein the received listing of the plurality of components is transmitted by a topology server coupled to the storage area network, and
   wherein the received notification of component failure is transmitted by a root cause analysis server coupled to the storage area network.

19. The article of claim 15, wherein the received path configuration information is in the form of initiator-target-LUN nexuses.

20. The article of claim 15, wherein the received path configuration information is logically grouped.

* * * * *